(12) United States Patent
Anderson et al.

(10) Patent No.: US 7,240,297 B1
(45) Date of Patent: Jul. 3, 2007

(54) USER ASSISTANCE SYSTEM

(75) Inventors: Carl T. Anderson, Apex, NC (US);
Gregory F. Bush, Morrisville, NC
(US); Michael Faoro, Pittsburgh, PA
(US); Susan E. Kahler, Raleigh, NC
(US); Alberta Lee, San Francisco, CA
(US); Janet L. Leskovec, Raleigh, NC
(US); Susan E. Liles, Raleigh, NC
(US); Lynn Percival, Raleigh, NC
(US); Keith A. Wells, Angier, NC (US)

(73) Assignee: International Business Machines Corporation, Armonk, NY (US)

( * ) Notice: Subject to any disclaimer, the term of this patent is extended or adjusted under 35 U.S.C. 154(b) by 682 days.

(21) Appl. No.: 09/592,387

(22) Filed: Jun. 12, 2000

(51) Int. Cl.
*G06F 3/00* (2006.01)

(52) U.S. Cl. .................. 715/854; 715/802; 715/859

(58) Field of Classification Search ............. 345/751, 345/854, 700, 713, 823, 711, 745, 789, 830, 345/811; 715/513, 802, 854, 859; 707/10, 707/200, 203
See application file for complete search history.

(56) References Cited

U.S. PATENT DOCUMENTS

| 4,803,039 A | 2/1989 | Impink, Jr. et al. ......... 376/216 |
| 4,949,290 A | 8/1990 | Pike et al. ................. 364/580 |
| 5,438,574 A | 8/1995 | Taniguchi .............. 395/183.14 |
| 5,584,036 A | 12/1996 | Kashihara ................... 395/800 |
| 5,712,654 A | 1/1998 | Kawashima et al. ........ 345/115 |
| 5,796,394 A * | 8/1998 | Wicks et al. ................. 345/751 |
| 5,825,356 A * | 10/1998 | Habib et al. ................ 715/712 |
| 5,870,559 A * | 2/1999 | Leshem et al. ............. 345/854 |
| 5,877,766 A * | 3/1999 | Bates et al. ................. 345/854 |
| 5,940,373 A | 8/1999 | Chiu et al. .................. 370/238 |
| 6,115,720 A * | 9/2000 | Bleizeffer et al. ........... 715/764 |
| 6,243,090 B1 * | 6/2001 | Machiraju et al. .......... 705/709 |
| 6,259,445 B1 * | 7/2001 | Hennum et al. ............ 715/709 |
| 6,275,223 B1 * | 8/2001 | Hughes ...................... 345/751 |
| 6,628,313 B1 * | 9/2003 | Minakuchi et al. ......... 715/853 |
| 6,734,883 B1 * | 5/2004 | Wynn et al. ................ 345/830 |
| 6,803,930 B1 * | 10/2004 | Simonson ................... 715/784 |

* cited by examiner

*Primary Examiner*—Weilun Lo
*Assistant Examiner*—Truc T. Chuong
(74) *Attorney, Agent, or Firm*—Synnestvedt & Lechner LLP; Martin J. McKinley

(57) ABSTRACT

A method and system for providing user assistance in utilizing a computer program is disclosed that provides the capability for combining an active display of the past, current, and future steps in an ongoing process with a series of associated decision panels and forms to be completed in order to carry out the steps. A navigator bar, which is situated adjacent to and can be scrolled independently of information appearing in a client area of a computer screen display, provides a user of the computer program with a map of the steps already executed, the current step being executed, and the most likely steps to be performed based on the current step being executed. If the user selects a different step to be the current step, the display of most likely future steps to be performed changes, if appropriate.

11 Claims, 14 Drawing Sheets

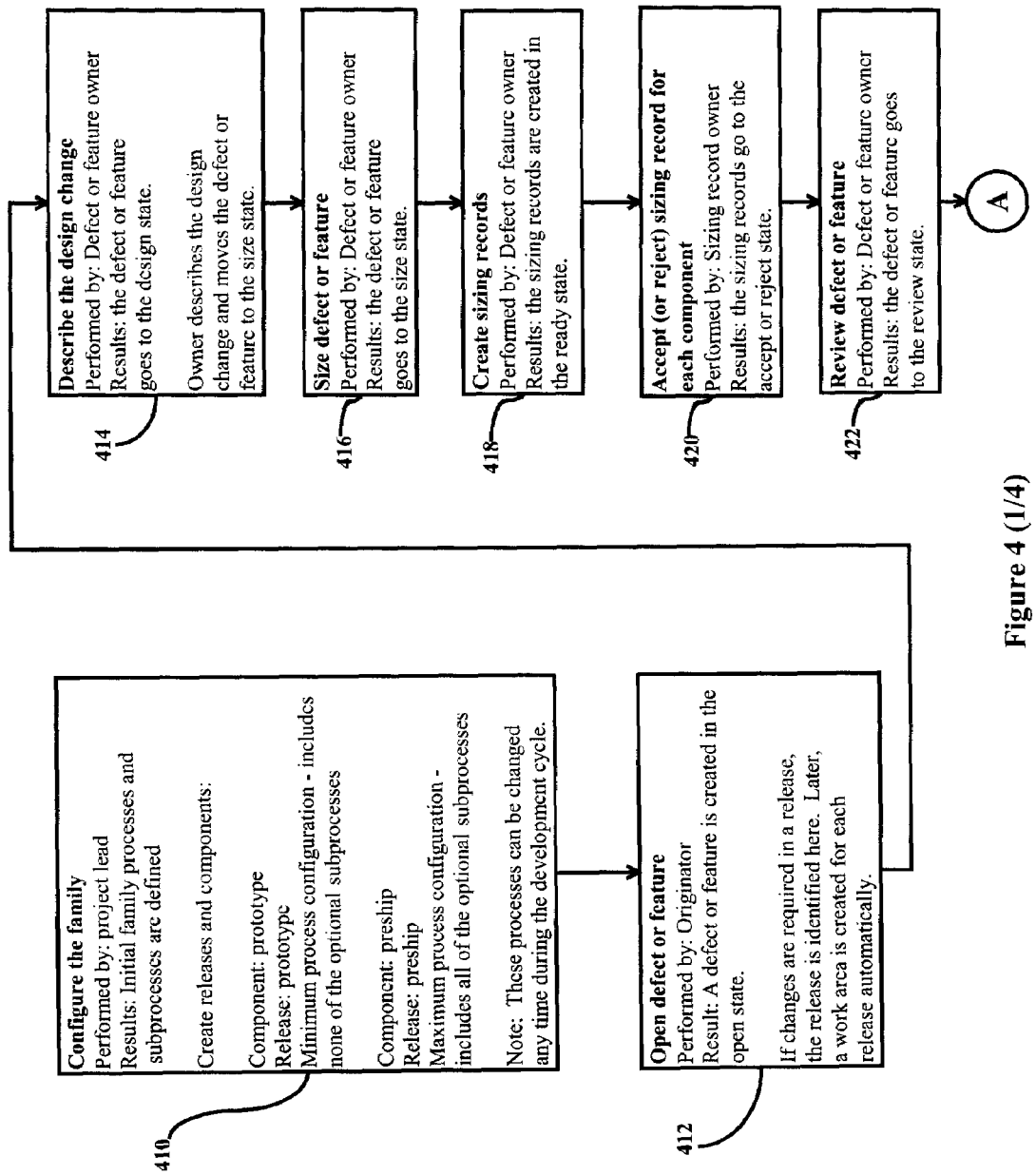
Figure 4 (1/4)

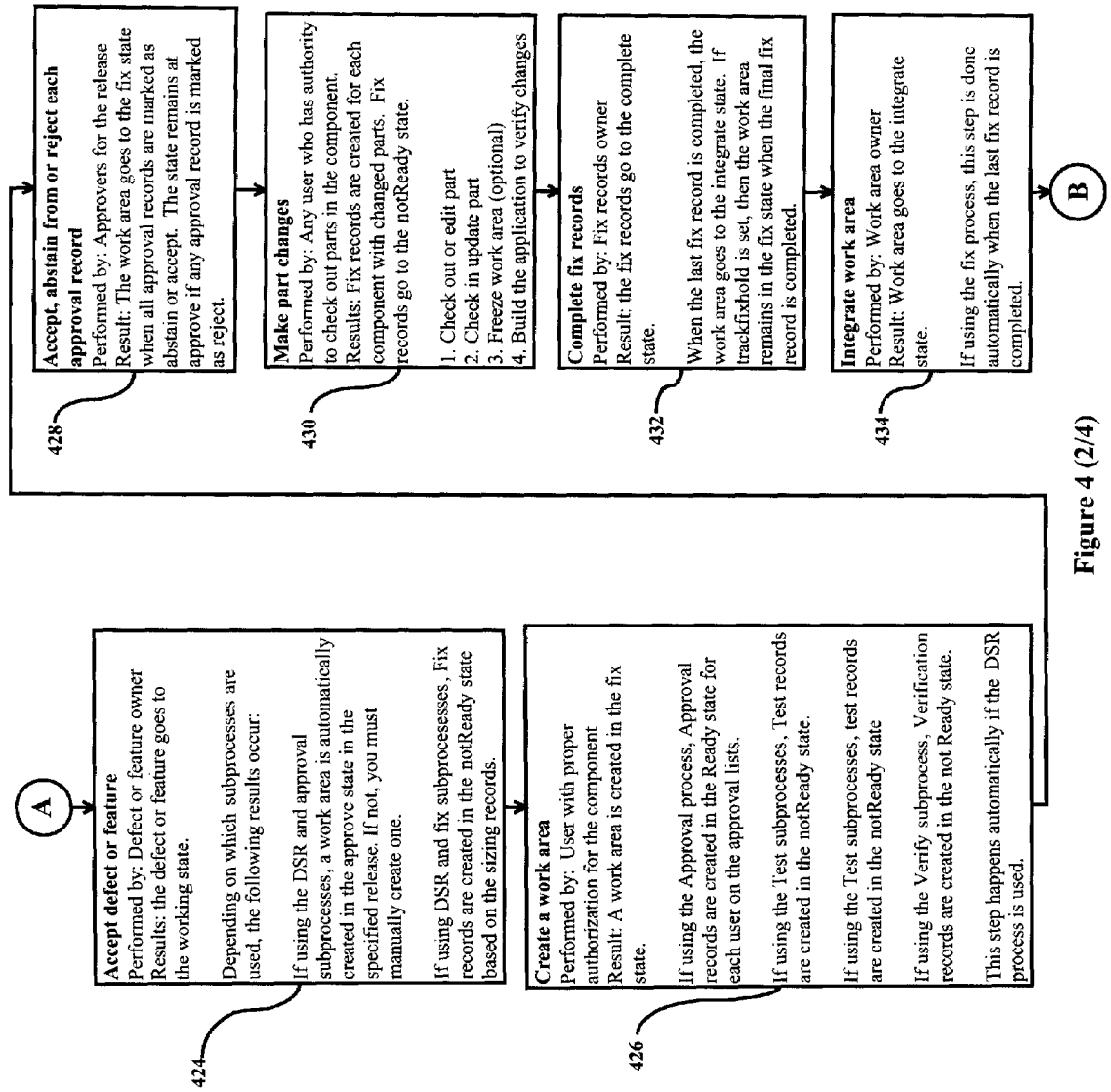
Figure 4 (2/4)

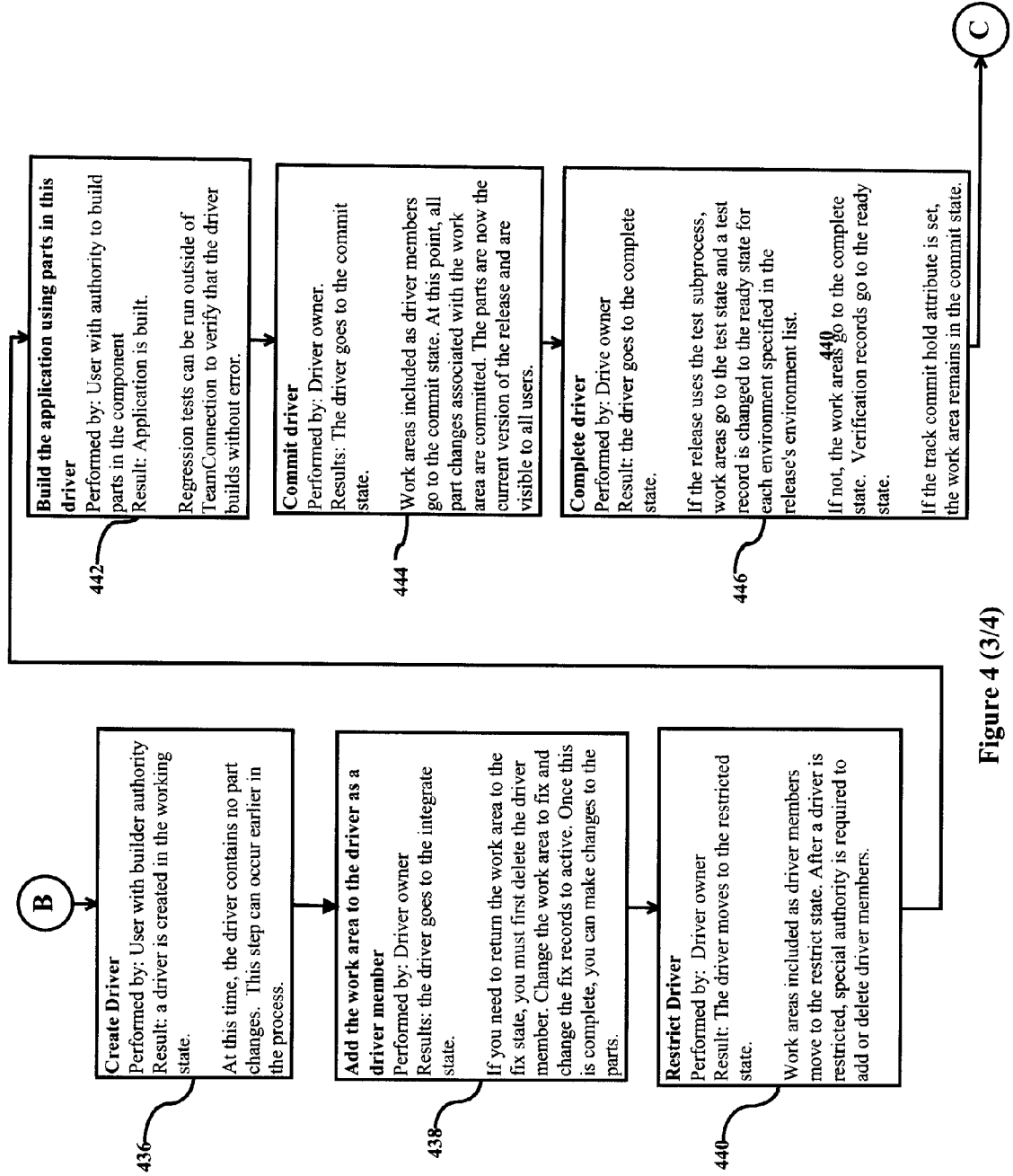
Figure 4 (3/4)

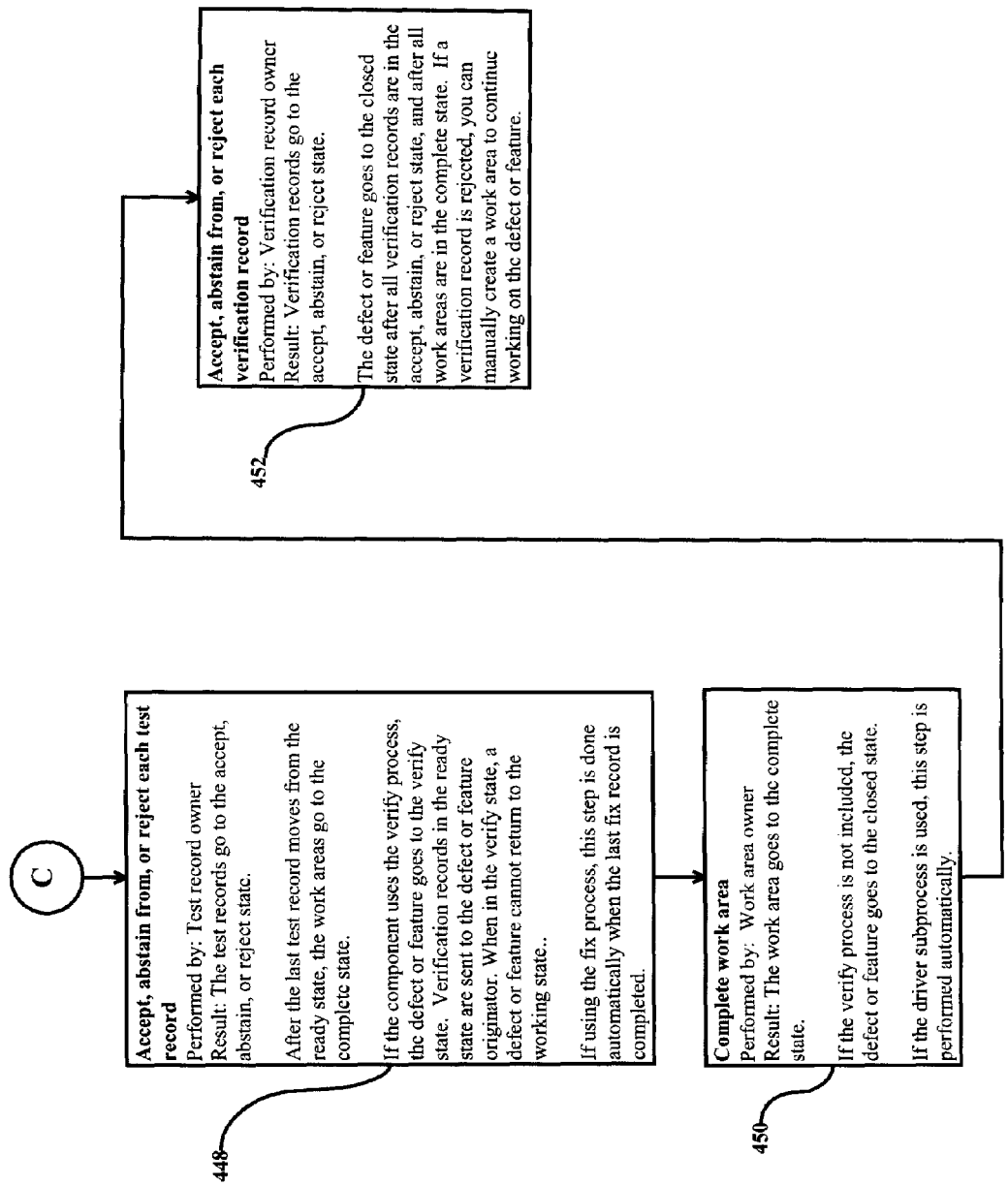
Figure 4 (4/4)

joaquim - IBM VATC

Defect 3 - View Details

| View Details | Defect Options | Accept Defect | Create Workarea | Select Workarea | Filter Parts | Works with Parts |

Read Information about the defect below. When you are finished, click Continue to work with the defect Details
- name: 3
- reference
- abstract: A complicated task
- duplicate

- state: open
- severity: 2
- age: 0

- compName: c
- release
- envName
- driver

- addDate: 1999/08/10 14:34:14
- lastUpdate: 1999/08/10 14:34:14
- andDate

- ownerLogin: ccc
- ownerName
- ownerArea

Change History
- priority
- target

- answer
- symptom: test failed
- phaseFound: usability_test
- phaseInject

- assignDate: 1999/08/10 14:34:14
- responseDate

- originLogin: ccc
- originName
- originArea

Notes

Done    ccc    Back  Continue    joaquim

FIG. 5 joaquim - IBM VATC

Defect 3 - Defect Options

| 506 | 508 | 510 | 512 | 514 | 516 | 518 |
| View Details | Defect Options | Accept Defect | Create Workarea | Select Workarea | Filter Parts | Works with Parts |

What would you like to do with this defect?

622 — ⦿ Accept and fix it
○ Add remarks
○ Return it to the originator
○ Assign it to someone else
○ Modify its properties
○ Cancel it
○ Go to my list of defects

502

Done         ccc    Back  Continue    joaquim

FIG. 6 joaquim - IBM VATC

Defect 3 - Defect Options  504

View Details | Defect Options | Return Defect
506   508   726

What would you like to do with this defect?

622 ○ Accept and fix it
     ○ Add remarks
724 ⊙ Return it to the originator
     ○ Assign it to someone else
     ○ Modify its properties
     ○ Cancel it
     ○ Go to my list of defects

502

Done          ccc          Back  Continue
                                      joaquim

FIG. 7

Defect 3 - Accept Defect

View Details | Defect Options | Accept Defect | Create Workarea | Select Workarea | Filter Parts | Works with Parts Fill out this form, then click Submit to accept the defect Required fields are marked with an asterisk (*) and must be filled.

Name*: 3

Answer*: redesign

Answer*: This process is too complicated and must be redesigned.

Symptom: test_failed

Phase found: usability_test

Phase injected: development

Priority: candidate

Target:

Back | Submit

FIG. 10 joaquim - IBM VATC

Defect 3 - Create Workarea — 521

520

| Accept Defect | Create Workarea | Select Workarea | Filter Parts | Work with Parts | Check in Parts | Final Options |
| 510 | 512 | 514 | 516 | 518 | 1020 | 1022 |

504

To create a new workarea, fill out the form and click Submit

Required fields are marked with an asterisk (*) and must be filled.

Name*

Release Name*    r

Defect/Feature name    3

Target

Owner

502

Done    ccc    Back    Submit — 825    joaquim

| joaquim - IBM VATC |
|---|

Defect 3 - Workarea3, Release r - Defect Options — 504

| View Details 506 | Defect Options 508 | Accept Defect 510 | Create Workarea 512 | Select Workarea 514 | Filter Parts 516 | Works with Parts 518 |
|---|---|---|---|---|---|---|

— 521

What would you like to do with this defect?

622 — ○ Accept and fix it
○ Add remarks
724 — ⊙ Return it to the originator
○ Assign it to someone else
○ Modify its properties
○ Cancel it
○ Go to my list of defects

502

| Done | | Back | Continue |
|---|---|---|---|
| | ccc | | joaquim |

USER ASSISTANCE SYSTEM

FIELD OF THE INVENTION

This invention relates to user assistance systems and methods in general, and more specifically, to methods for mapping past, current, and future steps performed in connection with a software system.

BACKGROUND OF THE INVENTION

Computers are becoming more and more an aspect of everyday life. Children as young as two years old are now exposed to computers and software programs in a home environment and they are now commonplace in schools, businesses, factories, and virtually every aspect of life.

User assistance programs are systems developed to provide guidance to the user of a software program. Wizards, coaches, and guides, all of which walk the user through the steps of a particular program, are well known. A drawback of these prior art systems, however, lies in the "snapshot" nature of such systems. Most programs comprise an interrelated series of steps to be performed, with the sequence of steps being variable depending upon the process to be performed. Typically, the user follows a "decision tree" where the user is given information about the present step (the currently-selected step) to be taken and is given instructions to either go to the next step (e.g., by hitting the "next" button in a GUI) or to go back to the previous step (e.g., by pressing a "back" button). While such systems do provide assistance, they provide no information regarding anything other than the immediately preceding or immediately subsequent step, i.e., there is no long-term historical path showing steps already taken, nor is there a "future" path given to show the user the likely steps to follow. Further, in a typical decision tree system, moving from a present frame to a previous frame will delete any information input into the present frame, i.e., the user cannot jump back and forth between positions in the tree structure without losing data input.

Another problem with typical decision tree systems is that the user may be able to move along the tree structure along "branches" which ultimately end up at a location where the particular user is unauthorized to perform any activity, or where the user simply did not wish to go, but could not tell for sure until he or she got there. For example, often a user relying on the user assistance aspects of a program is a novice user who is unfamiliar with the program and its operation. Frequently the user will receive error messages advising that a particular step requires a prior step to be performed, even though the particular user is not authorized to perform the step. This can cause the user to unknowingly take a path that leads to an undesired destination, wasting valuable time and increasing user frustration.

One example of a system involving a complicated set of processes that must be navigated, and which can benefit from a user assistance system, is in the field of software development. To support the explosive growth of computer usage, software development has become a key part of any company engaged in high-technology business. Large companies such as IBM and Microsoft may have many software development groups located at numerous locations throughout the world, with each group employing hundreds or thousands of employees. With large numbers of employees focusing their work on the development of these assets, management becomes a critical task. Typically, software development "teams" within a company, made up of many developers who are sometimes at different locations, are employed to produce a final product.

The use of software development teams allows the work required to develop a final software product to be divided among many individuals. Throughout the development of a product from start to finish (referred to herein as the software "life cycle"), different individuals access the components of the product being developed at all different times. To enable proper management of the product development, systems referred to as software configuration management (SCM) systems have been developed to allow control of the process to be maintained. These systems allow tracking and control of software development, and allow management of software development projects with respect to issues such as multiple developers working on the same code at the same time, targeting multiple platforms, supporting multiple versions, and controlling the status of code (for example, beta tests versus real release). Once such example of an SCM system is the VisualAge TeamConnection Enterprise Server™ developed and sold by IBM.

Utilization of SCM systems greatly increases productivity and simplifies the software development process for the development team members. Among their many benefits, SCM systems can provide user assistance by displaying to the developer the next step in the programming sequence; allowing different actions to be performed at different times, depending on input from a team leader; and allowing different team members to be authorized to perform different actions, while excluding access to others, based on input from a team leader. However, these programs may still be quite complicated and users of the SCM system can still get confused as to how far along in the life cycle they are, what steps in the life cycle are available to them, and what paths in the life cycle are most likely to be coming up, i.e., the problems of the prior art discussed above are not solved through the use of a typical SCM system.

Accordingly, it would be desirable to have a navigator program or user assistance system which combines an active display of the past, current, and future steps in an ongoing process with a series of associated decision panels and forms to be completed in order to carry omit the steps.

SUMMARY OF THE INVENTION

Accordingly, it is an object of the present invention to provide a method and system for providing user assistance in connection with a computer program which combines an active display of the past, current, and future steps in an ongoing process with a series of associated decision panels and forms to be completed in order to carry out the steps.

Another object of the present invention is to provide an active navigator which enables a user of a computer program to view a display listing past steps taken, the current step being executed, and the most likely future steps to be taken in the program, while simultaneously being able to view the current step being executed by the user.

Yet another object of the present invention is to provide a method and system whereby a user of a computer program can move backward from a current step along a series of previously-performed steps to view actions taken and/or data input during the executon of said previously-performed step, without losing any data input during the execution of the current step.

The present invention has particular application in a software-development environment where software configuration management programs utilizing multiple processes, each of which comprise a series of interrelated steps, are used.

To achieve the foregoing, and in accordance with the purpose of the invention as broadly described herein, the present invention provides a user assistance system for providing user assistance in connection with procedures associated with the operation of a computer program running on a computer system, each of the procedures comprising an interrelated series of steps, with one of the steps being a currently-selected step, the user assistance system comprising a client area displaying information pertaining to the currently-selected step; and a navigator bar adjacent to the client area, the navigator bar displaying a visual representation of the interrelated series of steps associated with the currently-selected step.

A method is also provided for providing user assistance in connection with procedures associated with the operation of a computer program running on a computer system, each of the procedures comprising an interrelated series of steps, with one of the steps being a currently-selected step, the method comprising the steps of generating a client area in which information pertaining to the currently-selected step is displayed; and generating a navigator bar adjacent to the client area, the navigator bar displaying a visual representation of the interrelated series of steps associated with the currently-selected step.

The present invention will now be described with reference to the following drawings, in which like reference numbers denote the same element throughout.

BRIEF DESCRIPTION OF THE DRAWINGS

FIG. 4 is a flow diagram illustrating an overview of the process steps followed when using a typical software configuration management (SCM) system; and FIGS. 5–11 are screen captures illustrating the user assistance system of the present invention utilized in connection with a software configuration management system

DETAILED DESCRIPTION OF THE PREFERRED EMBODIMENT

Figure 1:
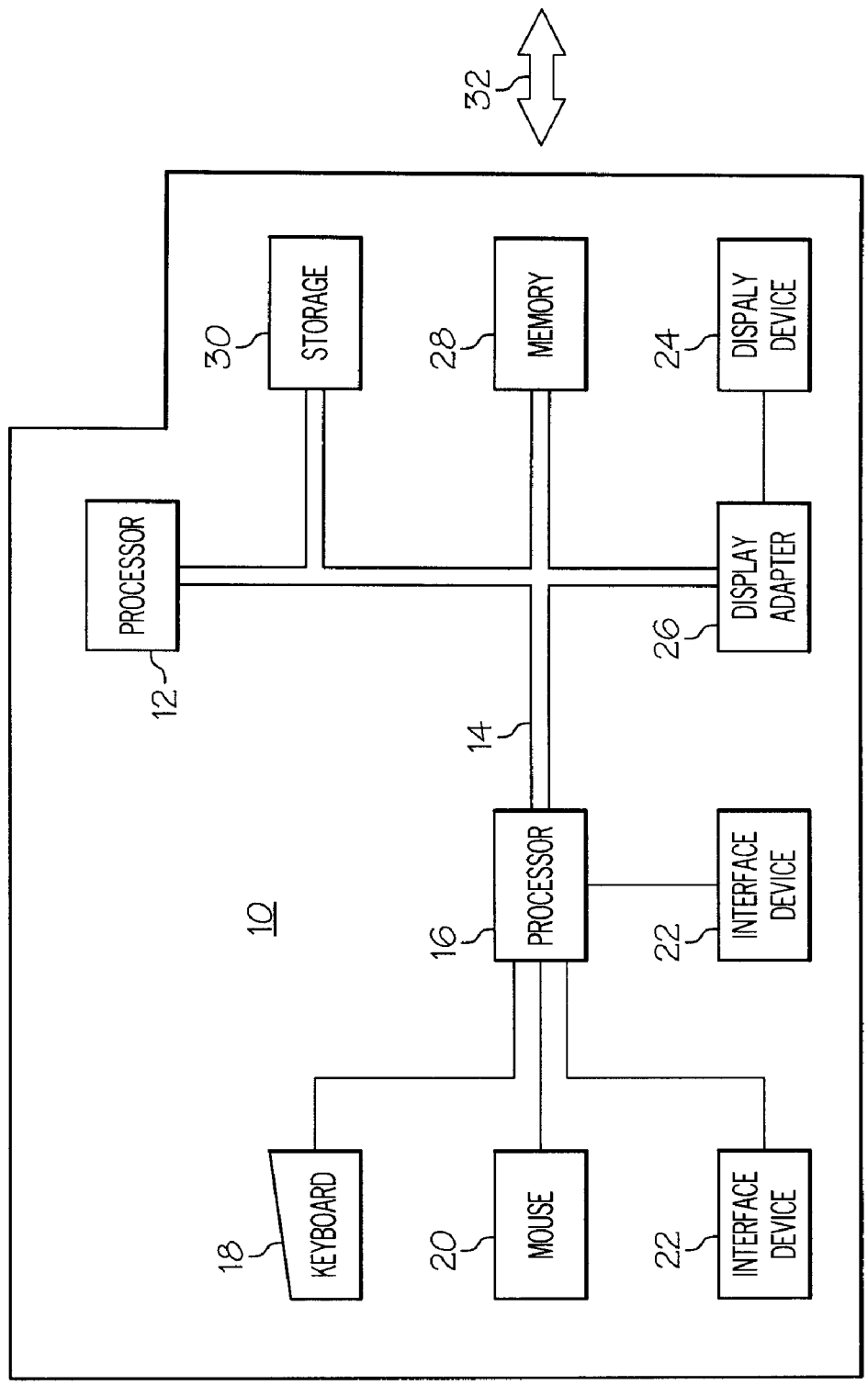
FIG. 1 is a pictorial representation of a data processing system which may be utilized to implement the present invention.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications of the materials for its construction and is not intended to limit the invention to the embodiment illustrated. Those skilled in the art will envision many other possible variations within the scope of the present invention.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long term storage 30 which can include a hard drive, tape drive, etc.

The workstation 10 communicates via a communications channel 32 with other computers or networks of computers. The workstation 10 may be associated with such other computers in a local area network (LAN) or a wide area network, or the workstation 10 can be client in a client/server arrangement with another computer, etc. All of these configurations, as well as the appropriate communications hardware and software, are known in the art.

Figure 2:
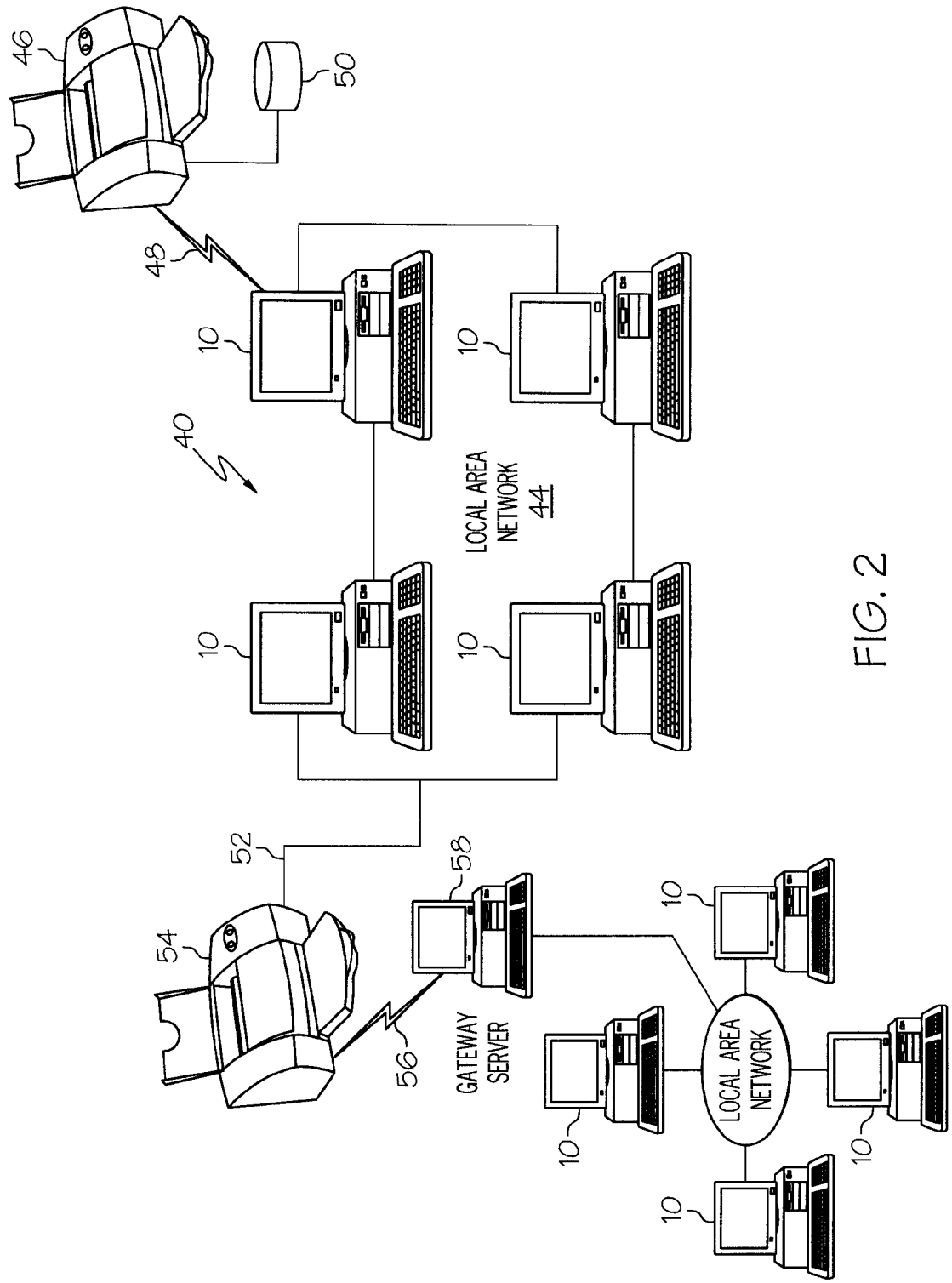
FIG. 2 is a diagram of a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" is a trademark of IBM; "Enterprise Systems Architecture/390", "Application System/400" and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically stored in permanent storage of some type, such as the permanent storage 30 of the workstation 10. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

A preferred embodiment of the present invention as applied to an SCM system will now be discussed with reference to FIGS. 3 through 11.

Figure 3:
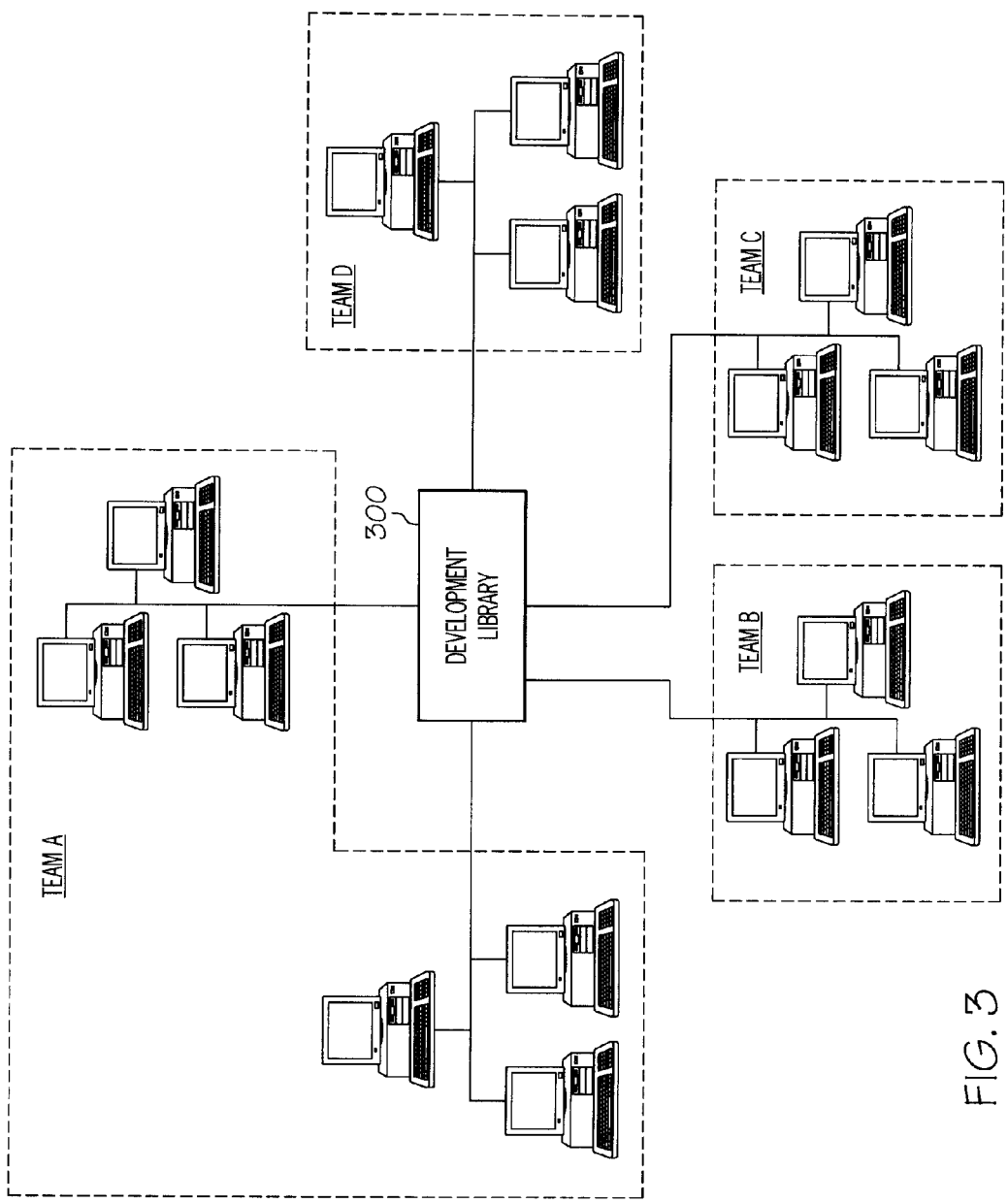
FIG. 3 is a block diagram illustrating the basic elements of a system in accordance with the present invention.

FIG. 3 illustrates a typical software development environment in which multiple developers access a central development library where all software assets under development are stored. As shown in FIG. 3, four distinct software development "teams" (Team A, Team B, Team C, and Team D) all access a central development library 300. The members of each team may be located at the same location or may be scattered at various locations throughout the world. Using this "hub and spoke" method, centralized access is available to the library for all teams and members.

To better understand the present invention, the following example based on an SCM system is provided. It is understood that that is given for purposes of explanation only, and that the present invention will find application in any system or environment where a series of steps and options are presented for selection.

FIG. 4 is a simplified flow diagram illustrating an overview of the interrelated series of process steps which may be followed when using the aforementioned SCM system, VisualAge TeamConnection by IBM. It is understood that the processes identified in FIG. 4 are presented for purpose of example only as typical of the interrelated series of process steps that might be followed when using an SCM system or any other system giving a user a series of steps and options from which to choose. Typically, software developers using prior art systems will hang a chart similar to FIG. 4 on the wall near their work station so that they can follow the steps and look forward or backwards on the chart to see where in the process they have been or may be heading. As described in more detail below, the present invention provides a visual representation of the same or similar information directly on the screen of the work station and in an interactive format which changes automatically depending on the actions of the software developer, without changing the data input by the user.

For the purpose of understanding the present invention it is only necessary to understand that operation of the SCM system gives the developer the ability to perform many different processes and subprocesses, and depending on which process is chosen, different options become available to the developer. For example, the steps illustrated in FIG. 4 can be categorized as follows: Blocks 410, 426, 430, and 450 comprise "minimum process configuration" subprocesses which are required for the SCM system. Blocks 412 and 424 comprise "tracking subprocesses" which, if utilized, track source code changes as the pertain to each enhancement request (feature) or maintenance request (defect). Blocks 414, 416, 418, 420, and 424 comprise the "design, size, and review" (DSR) subprocess. Use of this subprocess forces defects or features to go through a design state, a size state, and a review state before allowing any changes for that defect or feature. Block 428 comprises an "approval" subprocess; if implemented, any code change must be approved before it is put into the program. Blocks 432 and 434 comprise a "fix" subprocess. Blocks 436, 438, 440, 442, 444, and 446 comprise a "driver" subprocess. Block 448 comprises a "test" subprocess. Block 452 comprises a "verify" subprocess. Any or all of these subprocesses may be selected by the team leader when a new project is started using VisualAge TeamConnection.

Referring to FIG. 4, a configuration step is performed in block 410 by the project leader to define the processes and subprocesses to be developed by the software development team, and provide authorization (or exclude access) to particular members of the development team. At step 412, a "defect" or "feature" is opened by an originating member of the development team. As used herein, the term "defect" means an object used by a team member to formally report a problem, and the term "feature" means an object used by a team member to formally request and record information about a functional addition or enhancement to the program under development. Typically, each of the team members will have the authority to be an originator; the step of 412 is simply an identifying step in which an individual team member opens a new defect or feature to be worked on.

At step 414, the design change for the defect or feature is described and, at step 416, the defect or feature is moved to the "size" state. The "size" state refers to a subprocess step in which resources required to resolve a defect or implement a feature are identified, as are releases affected by the defect or feature. At step 418, the records relating to this sizing step are created and, at step 420, the sizing records are either accepted (meaning that the resources required to resolve the defect or implement the feature are available and within budgetary constraints) or rejected (meaning that the resources required are unavailable and/or too costly) and placed in the "accept" or "reject" state.

At step 422, the action of reviewing a defect or feature begins. At step 422, a reviewing team member may choose to accept a feature or defect, and they will be given several options for proceeding. The process continues through each of the steps of FIG. 4, with each step presenting potential options for the developer. It is not necessary to understand the details of each step of FIG. 4; it is sufficient for the purpose of explaining the present invention to understand that multiple steps, each potentially with multiple options which will affect the path followed by the developer, are presented to the developer while using the SCM system.

FIG. 5 illustrates a representative graphic user interface (GUI) panel 502 in which the system and method of the present invention is displayed in connection with an SCM system. Referring to FIG. 5, a client area 503 and a navigator bar 504 are shown in GUI panel 502. The client area 503 is the portion of the screen displaying the active area where a user will be working (e.g., inputting information) during use of the program. The navigator bar 504 is dividable into segments with each segment corresponding to one of the interrelated series of steps, also referred to herein as "subelements." The particular navigator bar illustrated in GUI panel 502 includes subelements 506 (view details), 508 (defect options), 510 (accept defect), 512 (create work area), 514 (select work area), 516 (filter parts), and 518 (work with parts). In this figure, the navigator bar 504 illustrates the most likely path to be followed by a user of the system when they have selected the view details button 506, i.e., "view details" is the "currently-selected step." With the "view details" button selected, detailed information about a particular issue (in this example, a defect entitled "defect 3") is illustrated in client area 503 below the navigator bar 504. The displayed information is typical data that would be used by a developer to analyze a particular defect being worked on.

Buttons 508 and 510 are "raised," meaning that they are active and they able to be selected at this point in time. Buttons 512, 514, 516, and 518 are "grayed out", indicating that they are future steps not yet performed, i.e., they are potentially going to be active at some point in the process, but they are currently not available for selection. By default, the present invention displays the most likely steps to be traversed based on the currently-selected step. A "prior history" arrow 520 and "subsequent history" 521 are shown which, when active, indicate to a user of the system that there is additional history along the navigator bar 504 available for viewing. The prior history arrow 520 and subsequent history arrow 521 will be active if there is relevant historical information to be viewed. By "depressing" an active arrow with a mouse click, the navigator bar 504 will change (i.e., scroll left or right) to display the relevant history, without changing what is displayed below the navigator bar 504. Thus, unlike use of the prior art "back" or "next" buttons, using the present invention a user may scroll back and forward along the paths without changing what is displayed in client area 503. The information displayed in the client area 503 below the navigator bar 504 is always dependent on which button on the navigator bar 504 is selected and not on which buttons are in view.

Since two buttons are active, buttons 508 and 510, the user has two choices for proceeding forward. In FIG. 6, active button 508 (defect options) has been depressed so that now "defect options" is the currently-selected step. This causes a list of the options available for selection by the user to be displayed in the client area 503 below the navigator bar 504. In this example, the developer is presented with a question designed to elicit which defect option the developer wishes to select. By default, the most commonly used option (in this example, "accept and fix it") is automatically selected when button 508 is depressed, as indicated by the darkened selection area 622. For ease of use, the current panel selection ("defect options") is also displayed above the navigator bar 504.

In accordance with the present invention, in addition to being able to simply accept the default option, the developer is given a choice of selecting from among the other options displayed. For example, as shown in FIG. 7, the developer has selected the defect option 724, "return it to the originator". Note at this point that option buttons 512, 514, 516, and 518, which were previously displayed, but grayed out indicating that they could potentially become available for selection, have now disappeared from the navigator bar 504 altogether. This is because, tinder the now-selected "return it to the originator" option, these choices will never become available and there is thus no need to show them. Note further that the "accept defect" button 510 has now been replaced with "return defect" 726, illustrating how the present invention adapts to the selections made by the user.

FIG. 8 illustrates what panel 502 would look like if, in the panel shown in FIG. 6, the user had clicked the "accept defect" button 510. As shown in FIG. 8, when the "accept defect" button is selected, the user is given, in this example, a "fill-in-the-blanks" form panel in client area 503. The user is prompted to fill in certain fields related to the "accept defect" option. Note that no button to the left of the "accept defect" 510 is active; this indicates that some action must be taken with respect to the "fill-in-the-blanks" form before continuing. Once the required fields are filled in with information, the user clicks on the "Submit" button 828 in the lower right corner to submit the form.

Figure 9:
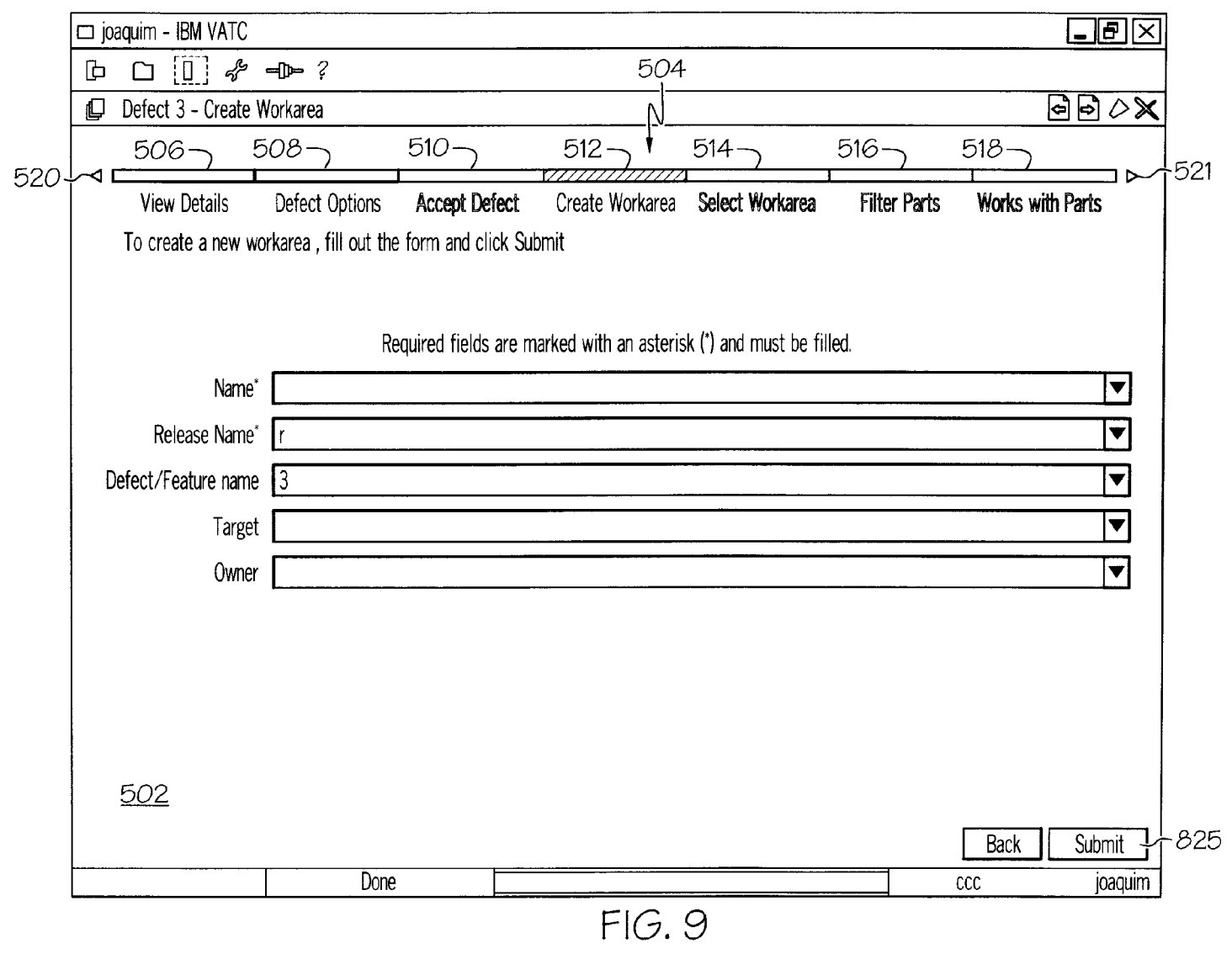

FIG. 9 illustrates what panel 502 would look like once the user has performed the "accept defect" action in FIG. 8 and pressed the "Submit" button 828. As shown in FIG. 9, the user is placed in the "Create Workarea" state, and cannot return directly to the "accept defect" state (in VisualAge TeamConnection, when a defect is being worked on, i.e., is in the "working" state, it cannot be accepted. Only an "open" defect can be accepted). Pressing the Back button would return the user to the "defect options" state (508), but a different set of options would be presented to the user (discussed below with respect to FIG. 11). However, since the "accept defect" state (510) was completed, it is still an integral part of the displayed historical information (i.e., it is still relevant information that should be displayed to the user), and thus it is not removed.

All of the steps displayable on the navigator bar 504 do not need to fit onto one screen. As noted above, history arrows 520 and 521 become active if there are steps that are not shown on their respective sides. In FIG. 9, arrow 520 is inactive, but arrow 521 is active. Pressing history arrow 521 yields the screen illustrated in FIG. 10. Note that the user has not progressed at all along the navigator bar 504; rather, the navigator bar 504 has simply shifted to the left to reveal additional "history" to the right. The user is still in the "create workarea" state (512) and the information displayed in client area 503 has not changed. Since there were only two additional states, "check in parts" (1020) and "final options" (1022), the current state, "create workarea" (512) did not scroll off the screen. The left history arrow (520) is now active, and since there are no more steps available to the right, the right history arrow (521) is inactive. However, the most likely path, displayed along the navigator bar 504, could be more than two screenwidths long. In such a case, upon first pressing right history arrow 521, both arrows would be active (since there would be history information available in both directions). Furthermore, upon transitioning from state to state (e.g., upon pressing a button on the navigator bar 504), the current state is always shown within the visible portion of the most likely path (until it is subsequently moved off screen using the history arrows).

Should the user complete the form in FIG. 10 and press the submit button, and then select the "defect options" button (508), the user would be presented with the panel illustrated in FIG. 11. This shows the state of the navigator bar 504 when the user can select an active button ahead of the current state, such as "select workarea" (514) or "filter parts" (516). Furthermore, as was previously stated, "accept defect" (510) is inactive, since this action has been performed and cannot be performed multiple times. Since the state of the defect has changed, the options presented at this panel reflect those changes. The first choice is now "continue working on it", which will move the user forward to the furthest step possible along the most likely path—in this case, "filter parts" (516). Also, steps to undo the "accept defect" selection are now possible—selection of the "undo workareas and return it" choice would show a most likely path of "undo workareas" and "return defect".

With the present invention, the user always has in view the path followed, the current selection-screen with available options, and the future steps that will be available for a particular selected option. The user is able to select from any of these available options to "jump" to the selected option. Since all of the information is provided on the computer screen of the user, there is no need to refer to printed flow diagrams to determine which options are available and which options have been traversed; all of this information is made immediately available to the user. Further, changes to the program used in connection with the navigator bar will be immediately available to the user; under the prior art systems, the printed flow diagrams would need to be collected and replaced with new diagrams reflecting the changes.

A user can quickly see how far along the most common route in the process has been traversed, as well as how much further the user must go to finish the most common route. The user can also see which steps are repeatable, skip forward (if possible) or back to another step, and when a different path is chosen from a decision panel, the user can quickly see what the most common steps are for the new path.

Although the present invention has been described with respect to a specific preferred embodiment thereof, various changes and modifications may be suggested to one skilled in the art and it is intended that the present invention encompass such changes and modifications as fall within the scope of the appended claims. For example, while the present invention is described herein as having particular application in connection with an SCM program, the present invention is not so limited. The present invention can be used in any system which gives a user options to select from along a sequence having a beginning and an end and/or which incorporate selective access to different areas of the program for different users. Such systems could include, but are not limited to, software installation programs, process monitoring systems (e.g., power plant monitoring systems), tax return preparation programs, medical records monitoring systems, litigation assistance programs, or any system where a user may be unfamiliar with the processes of the system. The present invention is useful in any environment in which it might be desirable to track and/or selectively jump forward or backward to future or prior steps. The programming of the present invention may be implemented by one of ordinary skill in the art of object-oriented programming.

The above-described user-assistance program and its individually described elements may be implemented in various computing environments. For example, the present invention may be implemented on a conventional IBM PC or equivalent, multi-nodal system (e.g., LAN) or networking system. All programming, algorithms, GUIs, display panels and dialog box templates, metadata and data related thereto are stored in computer memory, static or dynamic, and may be retrieved by the user in any of: conventional computer storage, display (i.e., CRT) and/or hardcopy (i.e., printed) formats.

We claim:

1. A user assistance system for providing user assistance in connection with selectable steps associated with the operation of a computer program running on a computer system, each of said selectable steps capable of being active or inactive, and each implementing one or more substeps when selected, with one of the selectable steps being a currently-selected step, said user assistance system comprising:
    a client work area displaying information pertaining to the currently-selected step; and
    a navigator bar adjacent to said client work area, said navigator bar continuously displaying a visual representation of said selectable steps, said visual representation including a display of steps that are active and steps that are inactive, said displayed steps comprising the most likely steps to be traversed in connection with the currently selected step;
    wherein said visual representation of said selectable steps displayed by said navigator bar further includes:
    past steps already performed by said computer program; and
    the currently-selected step;
    wherein said navigator bar is scrollable to allow viewing of selectable steps preceding the currently selected step, wherein the action of scrolling said navigation bar does not change the information being displayed in said client work area.

2. The user assistance system of claim 1, wherein said navigator bar is dividable into segments, with each segment corresponding to one of said steps of said selectable steps.

3. The user assistance system of claim 2, wherein said segments include active segments and inactive segments, and wherein selection of an active segment changes the currently-selected step to the step corresponding to said selected active segment.

4. The user assistance system of claim 3, wherein said navigator bar displays said segments in a serial manner, and wherein said navigator bar can be scrolled to allow viewing of segments preceding or following said segment corresponding to said currently-selected step.

5. The user assistance system of claim 1, wherein said information displayed in said client area comprises a selectable list of alternative choices for subsequent steps to be taken by said computer program.

6. The user assistance system of claim 5, wherein selection of one of said alternative choices causes said display of future steps not yet performed by said computer program to change to a display of future steps associated with said selected alternative choice.

7. A method for providing user assistance in connection with selectable steps associated with the operation of a computer program running on a computer system, each of said selectable steps capable of being active or inactive, and each implementing one or more substeps when selected, with one of the selectable steps being a currently-selected step, said method comprising the steps of:
    generating a client work area in which information pertaining to the currently-selected step is displayed; and
    generating a navigator bar adjacent to said client work area, said navigator bar continuously displaying a visual representation of said selectable steps, said visual representation including a display of steps that are active and steps that are inactive, said displayed steps comprising the most likely steps to be traversed in connection with the currently selected step;
    wherein said visual representation of said selectable steps displayed by said navigator bar further includes:
    past steps already performed by said computer program; and
    the currently-selected step;
    wherein said navigator bar is scrollable to allow viewing of selectable steps preceding the currently selected step, wherein the action of scrolling said navigation bar does not change the information being displayed in said client work area.

8. The method of claim 7, further comprising the step of dividing said navigator bar into segments, with each segment corresponding to one of said steps of said selectable steps.

9. The method of claim 8, wherein said segments include active segments and inactive segments, and wherein selection of an active segment changes the currently-selected step to the step corresponding to said selected active segment.

10. The method of claim 9, further comprising the steps of:

displaying said segments on said navigator bar in a serial manner; and providing means for scrolling said navigator bar, wherein said navigator bar can be scrolled to allow viewing of segments preceding or following said segment corresponding to said currently-selected step.

11. The method of claim 9, further comprising the step of displaying in said client area a selectable list of alternative choices for subsequent steps to be taken by said computer program.

* * * * *